Figure 1:
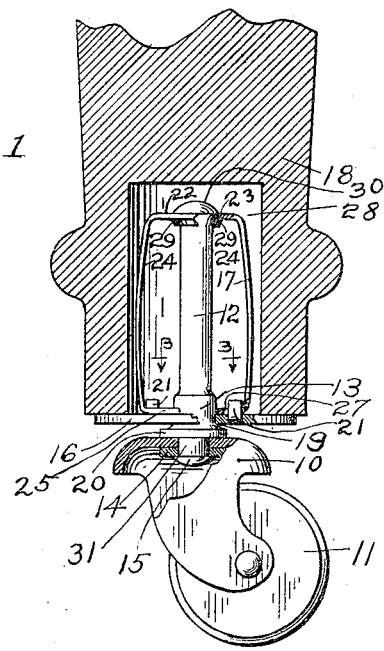

W. GOLDBACH.
CASTER.
APPLICATION FILED DEC. 24, 1909.

950,154.

Patented Feb. 22, 1910.

Witnesses
Ernst P. Wold
S. W. Atherton.

Inventor
William Goldbach
By A. M. Wooster
Attorney

UNITED STATES PATENT OFFICE.

WILLIAM GOLDBACH, OF MERIDEN, CONNECTICUT.

CASTER.

950,154.  Specification of Letters Patent.  Patented Feb. 22, 1910.

Application filed December 24, 1909. Serial No. 534,760.

*To all whom it may concern:*

Be it known that I, WILLIAM GOLDBACH, a subject of the Emperor of Germany, residing at Meriden, county of New Haven, State of Connecticut, have invented an Improvement in Casters, of which the following is a specification.

This invention has for its object to provide a simple, strong and inexpensive caster adapted for general use in furniture as in either metal or wooden bedsteads and which shall be so constructed as to be self-retaining in place without danger of dropping out in the ordinary conditions of use.

With these and other objects in view I have devised the novel caster which I will now describe, referring to the accompanying drawing forming a part of this specification and using reference characters to indicate the several parts.

Figure 2:
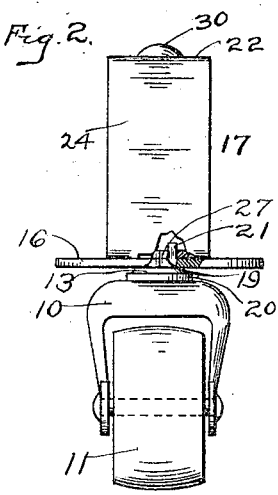
Figure 3:
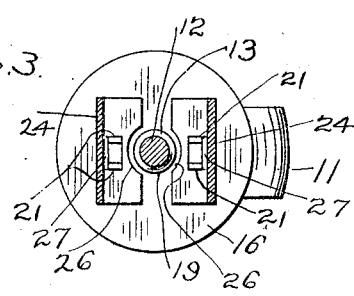
Figure 4:
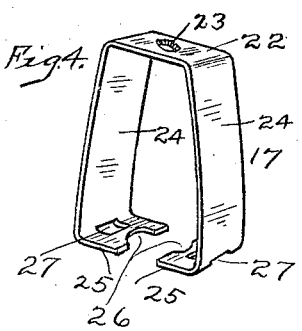

Figure 1 is a section of a furniture leg showing my novel caster in place therein, portions of the caster being broken away to show the mode of construction; Fig. 2 an elevation partly broken away of the caster detached, the point of view being from the right as seen in Fig. 1; Fig. 3 a section on the line 3—3 in Fig. 1 looking in the direction of the arrows; and Fig. 4 is a perspective of the spring frame detached.

10 denotes the yoke, 11 the wheel and 12 the pintle to which the yoke is rigidly secured. The special construction of the pintle and yoke is wholly immaterial so far as the present invention is concerned. I have shown the pintle as provided near its lower end with a hub 13 having a flange 20 which forms a bearing for the disk, presently to be described, and below the hub with a stud 31 which passes through the yoke and through a strengthening washer 14 and is headed down upon the washer as at 15, thus rigidly securing the pintle and yoke together. The wheel may be of any suitable material as wood, glass or metal or metal covered with rubber or felt. The novelty of my invention lies in the special construction of the disk, indicated by 16, and the frame, indicated by 17, and the manner in which they are connected together so as to give the maximum of spring power to the frame. In practice these parts are made by multiple acting punches and a complete part is turned out at each blow of the press. In use the disk lies closely against the end of a furniture leg which is indicated by 18. The disk is provided with a central hole 19 through which the hub passes, the hub being provided with flange 20 upon which the disk rests and supporting the entire weight to be carried.

21 denotes lugs in pairs which are struck out from the metal of the disk and extend upward at right angles to the plane of the disk.

The frame is formed from sheet metal, which may be provided in strips, and comprises a top 22 having a central hole 23 through which the pintle passes, spring sides 24 which are preferably slightly bowed outward, as shown in Fig. 1, to give the best possible spring action and inwardly turned arms 25 at the lower ends of the sides which are shown as provided in their ends with recesses 26 to give clearance to the hub and are provided back of the recesses with slots 27 which are of sufficient length to receive the pairs of lugs on the disk freely and of a width enough greater than the width of the lugs to permit ample spring movement of the sides when the frame is driven into the socket, indicated by 28, in the furniture leg. The metal surrounding central hole 23 in the top of the frame is preferably turned inward forming a flange 29 which bears on the pintle, the frame and disk being secured in place on the pintle by a heading 30 which however leaves the pintle free to rotate independently of the disk and frame.

The operation will be obvious from the drawing. The caster is assembled by placing the yoke and a washer over stud 31 and then heading the end of the stud down rigidly upon the washer, thus locking the yoke to the pintle. The disk is then placed over the pintle, then the frame is placed over the pintle with the pairs of lugs passing through slots 27 in the inwardly turned arms and the disk and frame are secured in place by heading down the end of the pintle loosely leaving the pintle free to rotate independently of the frame and disk. The caster is attached in place by simply driving the spring frame into the socket in a furniture leg until the disk bears against the end of the leg, the sides of the frame yielding as it is driven into the socket. As these side pieces are preferably outwardly bowed and as without regard to their special configuration they have a strong outward spring action, the pressure of the frame against the wall of the socket in the furniture leg will retain the caster securely in place.

Having thus described my invention I claim:

1. In a caster, the combination with a pintle having a flanged hub and a disk bearing thereon and having upwardly turned lugs, of a spring frame comprising a top, sides and inwardly turned arms at the lower ends of the sides which are provided with slots to receive the lugs.

2. A caster comprising a pintle having a flanged hub near its lower end, a yoke rigidly secured to the pintle, a disk bearing on the hub and having upwardly turned lugs and a spring frame comprising a top having a flange bearing on the pintle, spring sides and inwardly turned ends which loosely receive the lugs on the disk, the frame being retained upon the pintle by heading the upper end thereof.

In testimony whereof I affix my signature in presence of two witnesses.

WILLIAM GOLDBACH.

Witnesses:
MARY H. SAVAGE,
LEONARD S. SAVAGE.